(12) United States Patent
Wakano et al.

(10) Patent No.: US 9,661,246 B2
(45) Date of Patent: *May 23, 2017

(54) SOLID STATE IMAGE PICKUP DEVICE HAVING A CAPACITOR STRUCTURE MADE UP OF A PLURALITY OF CAPACITORS

(71) Applicant: Sony Corporation, Tokyo (JP)

(72) Inventors: Toshifumi Wakano, Kanagawa (JP); Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,081

(22) Filed: Mar. 15, 2016

(65) Prior Publication Data

US 2016/0198106 A1 Jul. 7, 2016

Related U.S. Application Data

(63) Continuation of application No. 14/701,972, filed on May 1, 2015, now Pat. No. 9,386,250, which is a continuation of application No. 11/176,476, filed on Jul. 7, 2005, now Pat. No. 9,077,922.

(30) Foreign Application Priority Data

Jul. 12, 2004 (JP) ................................. 2004-129388

(51) Int. Cl.
*H04N 5/357* (2011.01)
*H04N 5/372* (2011.01)
*H04N 5/3745* (2011.01)
*H04N 5/378* (2011.01)

(52) U.S. Cl.
CPC ........... *H04N 5/3575* (2013.01); *H04N 5/372* (2013.01); *H04N 5/378* (2013.01); *H04N 5/37455* (2013.01)

(58) Field of Classification Search
CPC .... H04N 5/378; H04N 5/3575; H04N 5/3745; H04N 5/37455
See application file for complete search history.

(56) References Cited

U.S. PATENT DOCUMENTS

| | | | | |
|---|---|---|---|---|
| 5,950,084 A | * | 9/1999 | Chao | H01L 27/10808 257/E21.648 |
| 9,386,250 B2 | * | 7/2016 | Wakano | H04N 5/3575 |
| 2002/0117690 A1 | * | 8/2002 | Rhodes | H01L 27/14609 257/215 |
| 2002/0118289 A1 | * | 8/2002 | Choi | H04N 5/3575 348/308 |
| 2003/0222687 A1 | * | 12/2003 | Kondou | H03K 5/249 327/124 |
| 2004/0080629 A1 | * | 4/2004 | Sato | H04N 5/335 348/222.1 |

* cited by examiner

*Primary Examiner* — Nelson D. Hernández Hernández
(74) *Attorney, Agent, or Firm* — Sheridan Ross P.C.

(57) ABSTRACT

A solid state image pickup device is provided that includes a pixel array unit having a plurality of pixels and a signal processing circuit that has a capacitor operatively configured to process a respective signal output from each of the plurality of pixels. The capacitor is operatively configured as a stacked capacitor or a trench capacitor.

17 Claims, 8 Drawing Sheets

SOLID STATE IMAGE PICKUP DEVICE HAVING A CAPACITOR STRUCTURE MADE UP OF A PLURALITY OF CAPACITORS

CROSS REFERENCE TO RELATED APPLICATIONS

This application is a continuation of U.S. patent application Ser. No. 14/701,972, filed May 1, 2015, which claims priority to U.S. patent application Ser. No. 11/176,476 filed Jul. 7, 2005, which claims priority to Japanese Patent Application No. JP 2004-129388, filed Jul. 12, 2004, the entire disclosures of which are hereby incorporated herein by reference.

BACKGROUND OF THE INVENTION

The present invention relates to a solid state image pickup device, and, in particular, to a solid state image pickup device in which a signal processing circuit including a capacitor is provided for each of pixel columns in a pixel array unit where pixels are arranged in a matrix pattern, each pixel including a photoelectric converting element.

A solid state image pickup device in which pixels are arranged in a matrix pattern, each pixel including a photoelectric converting element, may be classified into a charge-transfer solid state image pickup device represented by a CCD (charge coupled device) image sensor; or an XY-address solid state image pickup device such as a MOS (metal oxide semiconductor) image sensor, e.g., a CMOS (complementary metal oxide semiconductor) image sensor.

Further, an CCD image sensor may be classified into a horizontal CCD image sensor or a horizontal scanning CCD image sensor. In a horizontal CCD image sensor, a signal charge obtained by photoelectric conversion in a pixel is vertically transferred by a vertical CCD, which is provided for each pixel column in the CCD image sensor, and the signal charge is horizontally transferred by a horizontal CCD. Then, a charge detecting unit provided at an end portion of a transfer destination of the horizontal CCD performs voltage conversion, and each obtained signal voltage is sequentially read. In a horizontal scanning CCD image sensor, a signal charge obtained by photoelectric conversion in a pixel is vertically transferred by a vertical CCD, which is provided for each of pixel column in the CCD image sensor, and a charge detecting unit provided in a subsequent stage of the vertical CCD in each vertical pixel column performs voltage conversion. Accordingly, each obtained signal voltage is sequentially read by horizontal scanning.

In a conventional MOS image sensor and in a conventional horizontal scanning CCD image sensor, a signal processing circuit including a CDS (correlated double sampling) circuit or the like for removing fixed pattern noise of pixels is provided for each of vertical pixel column in the respective image sensor. Alternatively, the signal processing circuit may include an A/D (analog/digital) converter, which is also provided for each vertical pixel column.

In a conventional MOS image sensor, a signal processing circuit including a CDS circuit or the like may connect to one end of each of vertical signal lines. Therefore, the number of signal processing circuits is the same as that of pixel columns. If a pixel array unit of a conventional MOS image sensor is miniaturized to reduce a chip size, each signal processing circuit typically needs to be miniaturized accordingly. Capacitors are often indispensable for performing CDS processing or A/D conversion in a signal processing circuit for a conventional MOS image sensor, and thus the capacitors occupy a large area of the circuit. Therefore, if a scale of the signal processing circuit should be reduced in accordance with miniaturization of the pixel array unit, the area occupied by the capacitors needs to be reduced.

However, a smaller area occupied by the capacitors leads to a smaller capacitance. In the above-mentioned conventional CDS circuit or the A/D converter, noise is typically removed more effectively as a capacitance of a capacitor is increased. Therefore, an area occupied by a respective capacitor used for CDS or A/D converter noise removing processing should not be reduced to maintain noise removing effects of the CDS or A/D converter. Further, when a pixel pitch is reduced, the width of a capacitor in the signal processing circuit typically must also be reduced. As a result of this configuration, when a predetermined insulating space is secured between signal processing circuits in adjoining vertical pixel columns, a total capacitor area often increases.

When implementing a conventional CDS circuit, if an increased number of pixels are used for achieving higher resolution, the number of columns and the number of signal processing circuits increase, which increases output loads. Accordingly, a capacitor of a larger capacitance is required. However, as described above, an area occupied by the capacitor also increases as the capacitance increases.

SUMMARY OF THE INVENTION

The present invention has been made in view of the above-described problems and provides a solid state image pickup device realizing to obtain a larger capacitance of a capacitor included in a signal processing circuit provided for each of pixel columns without increasing a size of the signal processing circuit.

Articles of manufacture consistent with the present invention provide a solid state image pickup device that includes: a pixel array unit having a plurality of pixels, each pixel including a photoelectric converting element; and a signal processing circuit including a capacitor operatively configured to process a respective signal output from each of the plurality of pixels. The capacitor included in the signal processing circuit includes a stacked capacitor or a trench capacitor.

Systems consistent with the present invention provide a camera system that includes: a pixel array unit having a plurality of pixels, each pixel including a photoelectric converting element. The camera system further includes a signal processing circuit including a capacitor operatively configured to process a respective signal output from each pixel of the plurality of pixels and an optical system though which incident light is received by said pixel array unit. The capacitor included in the signal processing circuit includes a stacked capacitor or a trench capacitor.

DESCRIPTION OF THE PREFERRED EMBODIMENTS

Reference will now be made in detail to an implementation consistent with the present invention as illustrated in the accompanying drawings. Wherever possible, the same reference numbers will be used throughout the drawings and the following description to refer to the same or like parts.

Figure 1:
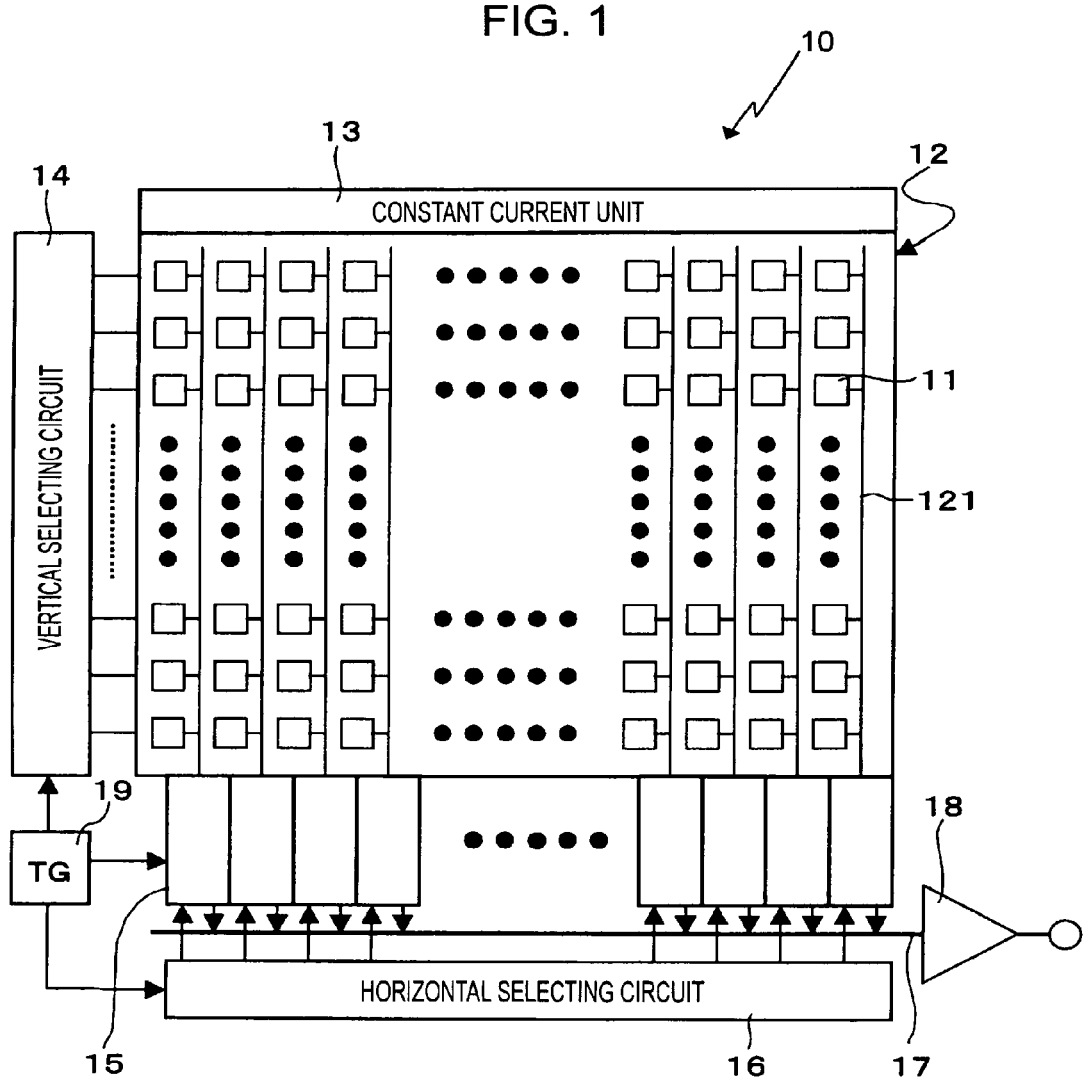
FIG. 1 is a block diagram showing an exemplary configuration of a solid state image pickup device in accordance with the present invention.

FIG. 1 is a block diagram showing an exemplary configuration of a solid state image pickup device 10 according to the present invention. In one implementation, the solid state image pickup device 10 is a CMOS image sensor. As shown in FIG. 1, the image pickup device 10 includes pixels 11, each including a photoelectric converting element; a pixel array unit 12 where the pixels 11 are two-dimensionally arranged in a matrix pattern to form a plurality of rows and columns of the pixels 11; a constant current unit 13; a vertical selecting circuit 14; column circuits 15 serving as signal processing circuits; a horizontal selecting circuit 16; a horizontal signal line 17; an output circuit 18; and a timing generator (TG) 19. The pixel array unit 12 has a plurality of vertical signal lines 121, each of which is connected to a respective column of pixels 11.

Figure 2:
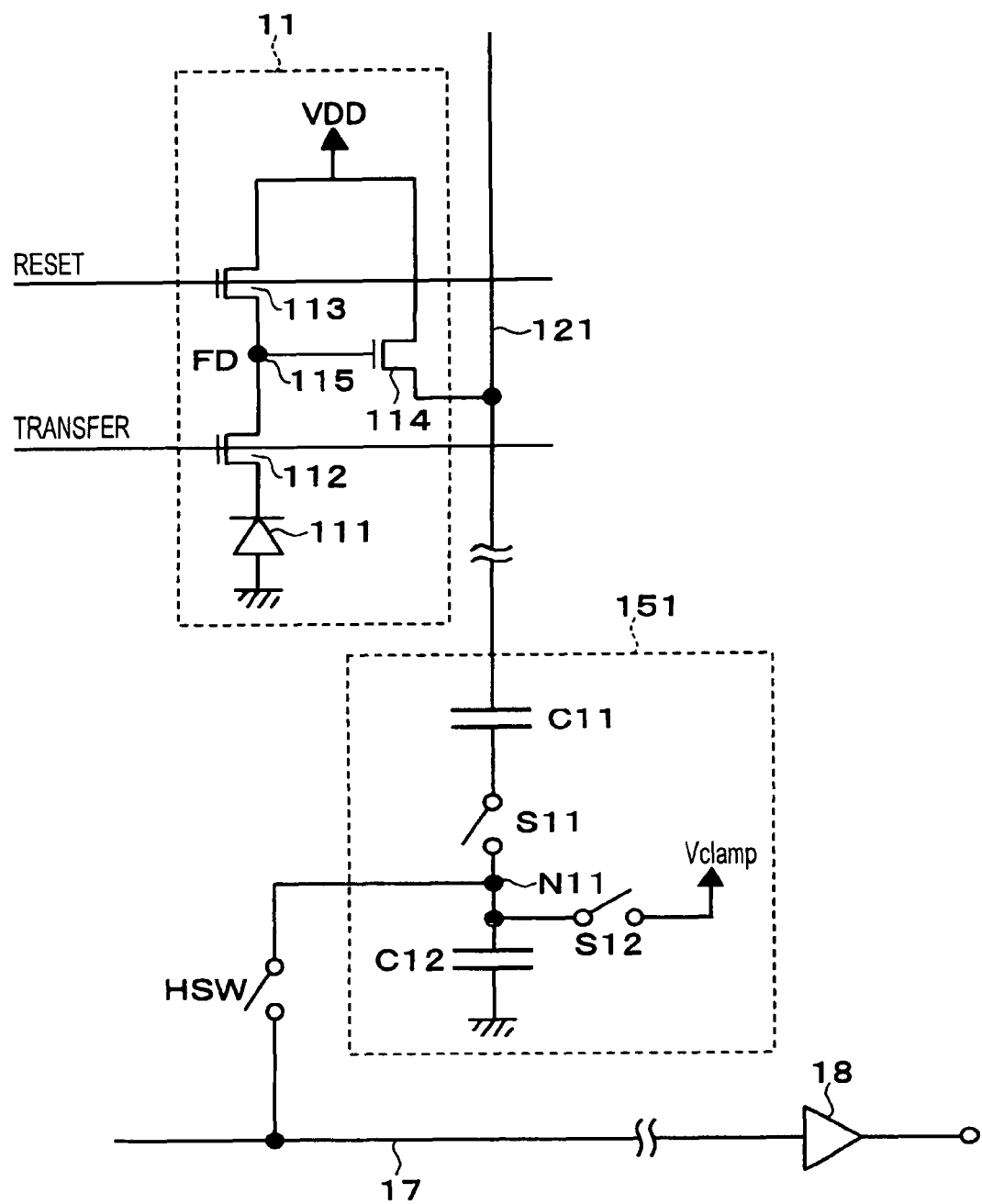
FIG. 2 is a circuit diagram showing an exemplary configuration of a pixel and a column circuit connected to the pixel in the solid state image pickup device according to a first embodiment.

FIG. 2 is a circuit diagram showing an exemplary configuration of one of the pixels 11 in one of the columns of pixels 11 and one 151 of the column circuits 15 operatively connected to the one pixel 11. As shown in FIG. 2, the pixel 11 functions as a pixel circuit that includes three transistors: a transfer transistor 112; a reset transistor 113; and an amplifying transistor 114, in addition to a photodiode 111 serving as a photoelectric converting element. In one implementation, N-channel MOS transistors are used as the transistors 112, 113 and 114.

The transfer transistor 112 and the reset transistor 113 each have a respective source or drain that are operatively connected to form a FD (floating diffusion) unit 115 with respect to the photodiode 111. The transfer transistor 112 transfers a signal charge (electrons) which has been photoelectrically converted by the photodiode 111 and accumulated therein to the FD unit 115. The reset transistor 113 connects between the FD unit 115 and a power supply VDD and resets a potential of the FD unit 115 prior to a transfer of a signal charge from the photodiode 111. The amplifying transistor 114 outputs the potential of the FD unit 115 reset by the reset transistor 113 (i.e., reset level) and the potential of the FD unit 115 transferred by the transfer transistor 112 (i.e., signal level) to the vertical signal line 121.

Herein, the pixel 11 includes the three transistors: the transfer transistor 112; the reset transistor 113; and the amplifying transistor 114. However, the pixel 11 is not limited to such a three-transistor configuration, but a four-transistor configuration can also be adopted. In that case, a selecting transistor (not shown in the figures) for selecting the pixel 11 is connected between the amplifying transistor 114 and the vertical signal line 121.

Referring back to FIG. 1, the constant current unit 13 includes a current mirror circuit or the like, which may use a MOS transistor to form the current mirror circuit. The current mirror circuit of the consistent current unit 13 connects to one end of each vertical signal line 121, which is provided for each of the vertical pixel columns. In one implementation, the constant current unit 13 functions as a source follower circuit in cooperation with the amplifying transistor 114 in each pixel 11.

The vertical selecting circuit 14 includes a shift register or the like. The vertical selecting circuit 14 sequentially outputs control signals, such as transfer signals for driving the transfer transistors 112 of the pixels 11 and reset signals for driving the reset transistors 113, in units of rows, so as to selectively drive the pixels 11 in the pixel array unit 12 in units of rows.

In one implementation, each column circuit 15 serves as a signal processing circuit for each pixel on a respective column of pixels 11 in the pixel array unit 12, that is, for each vertical signal line 121. Each column circuit 15 includes a S/H (sample hold) circuit and a CDS (correlated double sampling) circuit 151 (hereinafter referred to as a "S/H and CDS circuit 151"). The S/H and DCS circuit 151 is described below as the column circuit 15 serving as a signal processing circuit according to a first embodiment.

As shown in FIG. 2, the S/H and CDS circuit 151 includes a first capacitor C11, a first end of which is operatively connected to one end of the vertical signal line 121; a switch element S11, one end thereof is operatively connected to a second end of the first capacitor C11; a second capacitor C12 connected between another end of the switch element S11 and a reference potential, e.g., a ground potential; and a switch element S12 connected between the other end of the switch element S11 and a clamp potential "Vclamp".

Next, an exemplary method of operation of the S/H and CDS circuit 151 having the above-described configuration is described. A reset level at reset of the FD unit 115 is output from the pixel 110 through the vertical signal line 121 and the reset level is clamped to the first capacitor C11. Then, a signal level of the FD unit 115 when a signal charge is transferred from the photodiode 111 is output through the vertical signal line 121. Accordingly, a difference between the reset level and the signal level is sampled and is held in the second capacitor C12. In this implementation, by obtaining the difference between the reset level and the signal level, a pixel signal in which fixed pattern noise is suppressed is held in the second capacitor C12.

Referring back to FIG. 1, the horizontal selecting circuit 16 includes a shift register or the like, and sequentially selects signals of the respective pixels 11 output through the column circuits 15 so as to output the signals to the horizontal signal line 17. In FIG. 2, a potential of a node N11, which is a common connecting node of the switch elements S11 and S12 and the second capacitor C12, is adapted to receive a noise-removed signal of the pixel 11. This noise-removed signal is output to the horizontal signal line 17 through a horizontal selecting switch HSW (not shown in FIG. 1). There is a horizontal selecting switch HSW for each column circuit 15. Each horizontal selecting switch HSW is ON/OFF-driven by the horizontal selecting circuit 16.

Signals of the pixels 11 are sequentially output from the column circuits 15 in units of columns by selective driving performed by the horizontal selecting circuit 16. The signals are supplied through the horizontal signal line 17 to the output circuit 18, which may amplify and further process the signals before transferring outside of the device. The timing generator 19 generates various timing signals and controls the vertical selecting circuit 14, the column circuits 15, and the horizontal selecting circuit 16 based on the timing signals.

In this embodiment, the image pickup device 10 having the above-described configuration is characterized in that a stacked capacitor or a trench capacitor is used for at least one of (preferably both of) the capacitors C11 and C12 included in the column circuit 15 (S/H and CDS circuit 151 in this example), instead of a typical planar capacitor. Both the stacked capacitor and the trench capacitor have a three-dimensional height (depth). By increasing a surface area, a capacitance can be increased while minimizing a two-dimensional area.

Figure 3:
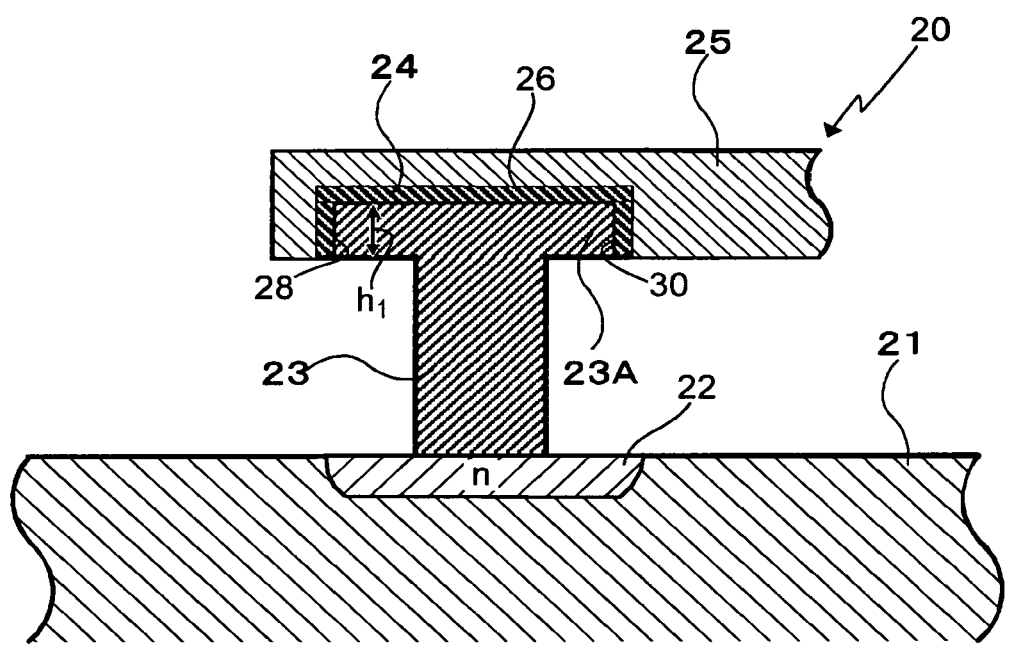
FIG. 3 is a cross sectional view showing an exemplary configuration of a stacked capacitor in accordance with the present invention.

FIG. 3 is a cross sectional view showing an example of a configuration of a stacked capacitor 20 in accordance with the present invention. As shown in FIG. 3, the stacked capacitor has a MIM (metal insulator metal) configuration including a metallic wiring 23 having a T-shaped cross section, that provides an electric contact with an n-type diffusion layer 22 in a silicon substrate 21; an insulating film 24 placed around a top portion 23A of the metallic wiring 23; and a storage electrode 25 made of polysilicon or the like and having a low resistance. The storage electrode 25 is disposed over the top portion 23A of the metallic wiring 23. The insulating film 24 is disposed between the storage electrode 25 and the top portion 23A.

In the implementation of the stacked capacitor shown in FIG. 3, the insulating film 24 covering the top portion 23A of the metallic wiring 23 serves as a capacitor portion. More specifically, the stacked capacitor 20 has a capacitor portion (insulating film 24) along a top surface 26 and side surfaces 28 and 30 of the top portion 23A of the metallic wiring 23 so as to realize a three dimensional capacitor. In this way, a total surface area can be increased by increasing a height (h) of side surfaces 28 and 30 without changing an area or a size of the top surface 26 of the top portion 23A of the metallic wiring 23. Accordingly, a capacitance can be increased while minimizing a two-dimensional area of the top surface 26.

Figure 4:
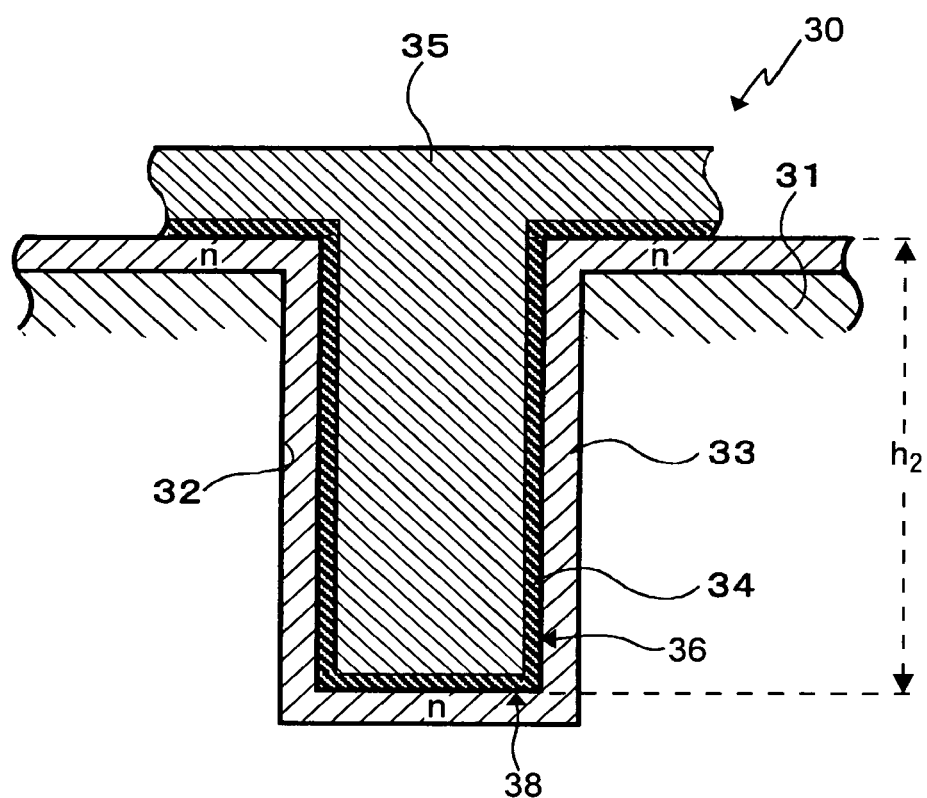
FIG. 4 is a cross sectional view showing an exemplary configuration of a trench capacitor in accordance with the present invention.

FIG. 4 is a cross sectional view showing an example of a configuration of a trench capacitor 30 in accordance with the present invention. As shown in FIG. 4, the trench capacitor 30 has a MIM configuration including a trench 32 extending in a depth direction of a silicon substrate 31; an n-layer 33 of a high concentration and a low resistance placed on a surface of the trench 32; an insulating film 34 placed along a surface of the n-layer 33; and a storage electrode 35 embedded in the trench 32 over the n-layer 33 and the insulating film 34.

In the trench capacitor 30, the insulating film 34 along the surface of the n-layer 33 serves as a capacitor portion. More specifically, the trench capacitor 30 has a capacitor portion (insulating film 34) along a wall and a bottom surface 38 of the trench 32 so as to realize a three dimensional capacitor. In this way, a total surface area of the capacitor portion of the n-layer 33 may be increased by increasing a height ($h_2$) of the wall (a depth of the trench 32) without changing a size of the bottom surface 38 of the trench 32. Accordingly, a capacitance can be increased while minimizing a two-dimensional area of the bottom surface 38.

When the stacked capacitor 20 or the trench capacitor 30 (hereinafter collectively referred to as a "stacked/trench capacitor") is used for the capacitors C11 and C12 in the S/H and CDS circuit 151, each of the capacitors C11 and C12 can be formed with a single stacked/trench capacitor. When the stacked capacitor 20 is used, a transistor circuit may be provided under a capacitor electrode (e.g. under wiring 23 of the capacitor 20) thereof so as to save an area.

A stacked/trench capacitor of a large capacitance for example several hundred of fF to several pF, may not be practical to implement in a circuit. However, in one implementation, a plurality of stacked/trench capacitors may be used. For example, in the implementation shown in FIG. 5, many small stacked/trench capacitors 52 and 54 having the same capacitance are two-dimensionally arranged to form portions 56 and 58 of a capacitor column 50 that may be used to implement capacitors C11 and C12. In this area or case, the capacitance need not always be the same in all of the stacked/trench capacitors 52 and 54, but the capacitance may be different in each of the stacked/trench capacitors 52 and 54.

As described above, by using stacked/trench capacitors 20, 30, instead of typical planar capacitors, as the capacitors included in the column circuit 15 provided for each vertical pixel column in the pixel array unit 12, that is, as the capacitors C11 and C12 of the S/H and CDS circuit 151, a large capacitance can be obtained in accordance with an area in a depth direction (e.g. area associated with wall 36 of the trench capacitor) without increasing a two-dimensional area of the capacitance (e.g. bottom surface 38 of the trench capacitor 30). Thus, since the stacked/trench capacitor 20 or 30 has a three-dimensional configuration, the capacitance associated with the stacked/trench capacitor 20 or 30 depends on not only a two-dimensional area but also a three-dimensional area in a height/depth direction. By increasing a surface area in a height/depth direction (e.g. wall 36), a two-dimensional area (e.g., bottom surface 38) may be reduced accordingly. Therefore, a two-dimensional area of the capacitor may be reduced in accordance with the present invention. This enables a reduction in a two-dimensional area of the capacitors C11 and C12 and a scale of the S/H and CDS circuit 151, which results in miniaturization of the pixel array unit 12 and a chip size of the image pick-up device 10.

Further, since capacitances of the capacitors C11 and C12 can be increased without changing a two-dimensional area of the capacitors C11 and C12, in other words, without increasing a scale of the S/H and CDS circuit 151, fixed pattern noise of the pixel 11 can be removed more effectively. If an increased number of pixels are used for realizing higher resolution, an increased number of pixels must be connected to the vertical signal lines 121, and thus loads on the capacitors C11 and C12 in the S/H and CDS circuit 151 increase, so that capacitors of a larger capacitance need be used as the capacitors C11 and C12. Even in such a case, the capacitances of the capacitors C11 and C12 can be increased without changing a two-dimensional area (e.g., top surface 26 or bottom surface 38) which may be defined as a contact surface for an associated active component, such as a transistor circuit. In this way, the stacked/trench capacitor 20 or 30 may easily adapt to an increase in the pixels (higher resolution).

Figure 5:
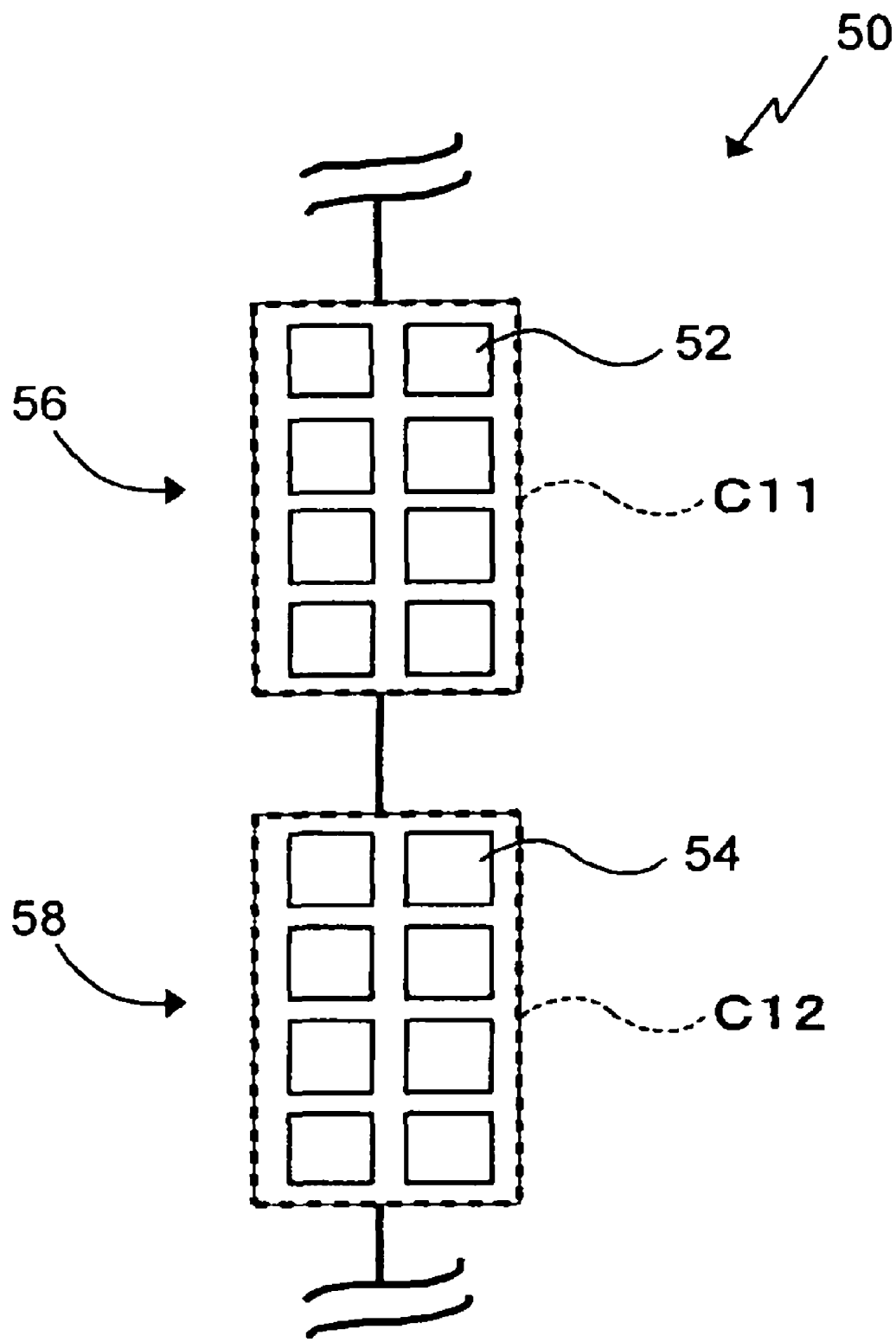
FIG. 5 shows an exemplary configuration of a capacitance column having stacked/trench capacitors in accordance with the present invention.

Conventional stack and trench capacitors have been used in a DRAM (dynamic random access memory). However, conventional stack and trench capacitors used in a DRAM typically have small capacitance of several tens of fF. However, conventional stack or trench capacitors having a large capacitance of about 1 pF or greater have not been put into a practical use. Moreover, conventional stack or trench capacitors have not been used in a signal processing circuit provided for each column of pixels of a solid state image pickup device. In accordance with one aspect of the present invention, as shown in FIG. 5, by arranging many stacked/trench capacitors 52 and 54, each having a small capacitance of several tens of fF, in a small-width area 56 and 58, each capacitor column 50 can be accommodated within a column of a small pixel pitch 50 in the solid state image pickup device 10. By forming the capacitors C11 and C12 by two-dimensionally arranging many small stacked/trench capacitors 52 and 54 having the same capacitance, advantageous effects may be obtained compared to a case where a single stacked/trench capacitor is used. That is, an arbitrary large capacitance can be accurately obtained by selecting a corresponding number of small stacked/trench capacitors 52 and 54, which collectively suppress a variation in the large capacitance.

Furthermore, the stacked/trench capacitor can be easily applied to a plurality of solid state image pickup devices each having a different pixel size without redesigning the stacked/trench capacitor. In this implementation, the number of stacked/trench capacitors 52 and 54 arranged in a width direction is adjusted in accordance with a pixel pitch, and a capacitance thereof is set by adjusting the number of capacitors in a length direction. When planar capacitors are used, an effect at borders therebetween is significant. Further, if planar capacitors are arranged with small pixel pitches of a solid state image pickup device, an estimation of total capacitance may not be accurately obtained or a large isolation width between or at borders of the planar capacitors must be provided. However, by forming a large capacitor by arranging many small stacked/trench capacitors of the same capacitance, an effect at borders therebetween can be sufficiently reduced, the capacitance can be set simply by adjusting the number of stacked/trench capacitors, and only a small isolation width is required.

Herein, both of the capacitors C11 and C12 in the S/H and CDS circuit 151 are formed by using stacked/trench capacitors (20, 30, or 52 and 54 in a capacitance column 50). Alternatively, only one of the capacitors C11 and C12 may be formed by using stacked/trench capacitors, so that two-dimensional capacitors (planer capacitors) and three-dimensional capacitors are mixed.

Figure 6:
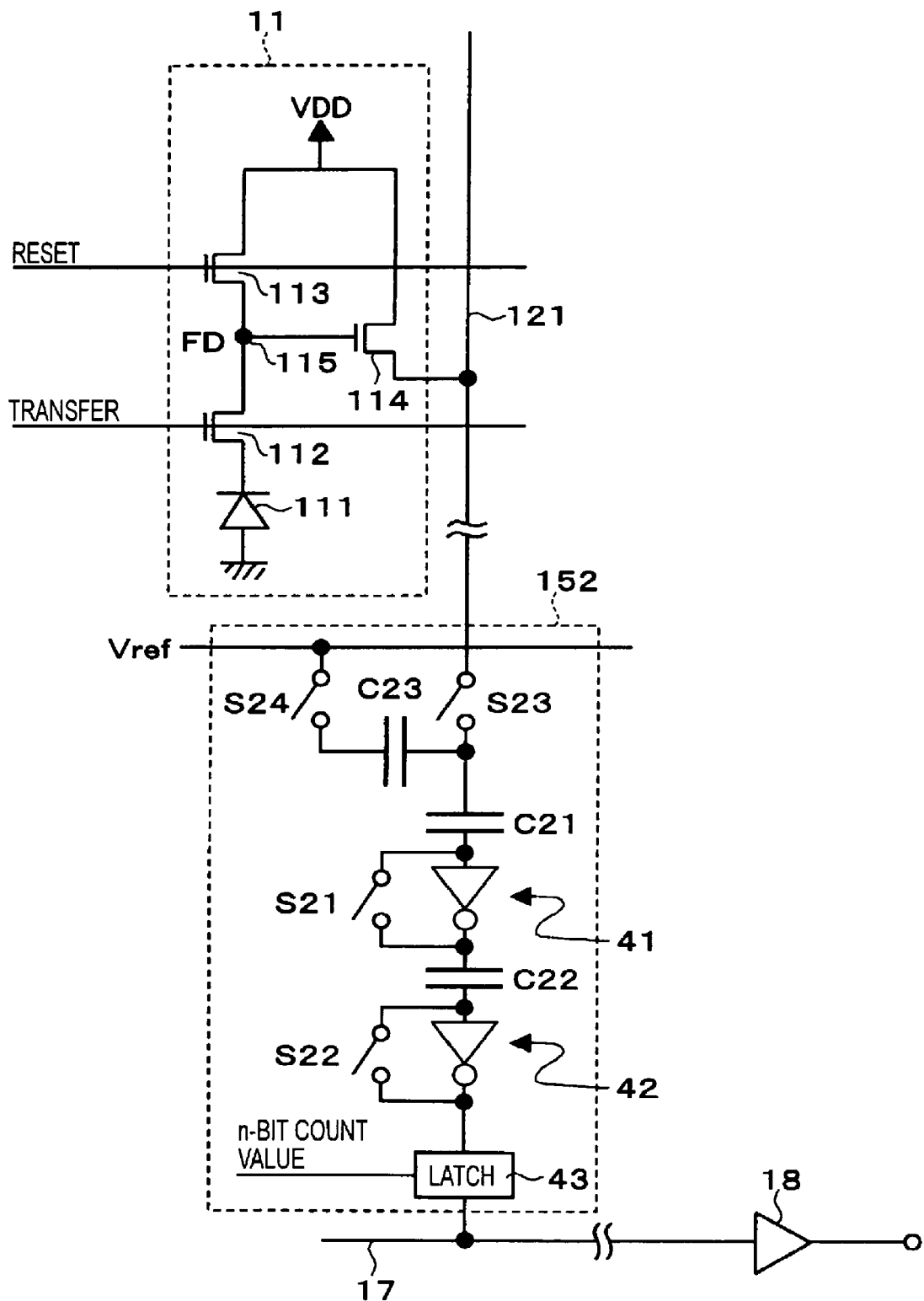
FIG. 6 is a circuit diagram showing an exemplary configuration of an A/D converter in accordance with a second embodiment of the present invention.

In the first embodiment, the S/H and CDS circuit 151 is used as the column circuit 15. In a second embodiment, an A/D (analog/digital) converter 152 is used as the column circuit 15 as shown in FIG. 6. In this implementation, the A/D converter 152 is one of a plurality of column circuits 15 provided for each of the vertical pixel columns in the pixel array unit 12.

FIG. 6 is a circuit diagram showing an exemplary configuration of the A/D converter 152 serving as the column circuit 15 in accordance with a second embodiment of the image pickup device 10. As shown in FIG. 6, the A/D converter 152 includes two stages of chopper comparators 41 and 42 and a latch circuit 43. The A/D converter 152 converts an analog signal output from the pixel 11 through the vertical signal line 121 to a digital signal while suppressing fixed pattern noise of the pixel 11 before outputting the digital signal to the horizontal signal line 17. As is clear from FIG. 6, three capacitors C21, C22, and C23 are used in the A/D converter 152.

Next, an exemplary method of operation of the A/D converter 152 having the above-described configuration is described. First, when a reset level is output from the pixel 11, a switch S23 for capturing the reset level is closed. After switch S23 is closed, switches S21 and S22 for the comparators 41 and 42 are closed at the same time. The switch S21 is then opened after a predetermined time period, and then the switch S22 is subsequently opened.

When a signal level is output from the pixel 11 as shown in FIG. 6, the signal level is sampled by the switch S23, the switch S23 is opened after the sampling has been completed, and a reference voltage Vref having a RAMP waveform is applied through the switch S24. After a pre-defined time, an input voltage of the A/D converter 152 exceeds a threshold voltage of the comparators 41 and 42 in accordance with the RAMP waveform, and accordingly, an output of the second-stage comparator 42 is inverted. A count value of an n-bit counter (not shown in figures) at that time corresponds to the pixel signal output from the pixel 11. A value of this signal is stored in the latch circuit 43.

At least one of the capacitors C21, C22, and C23 included in the A/D converter 152 is formed by using stacked/trench capacitors 20 or 30 having the same configuration as those described in the first embodiment. In one implementation, multiple small stacked/trench capacitors 52 and 54 having the same capacitance are two-dimensionally arranged to form one of the capacitors C21 to C23.

As described above, in the image pickup device 10 using the A/D converter 152 as the column circuit 15, by forming the capacitors C21 to C23 in the A/D converter 152 by using stacked/trench capacitors instead of typical planar capacitors, a two-dimensional area of the respective capacitors C21 to C23 can be reduced, which leads to a reduction in a scale of the A/D converter 152. Accordingly, the pixel array unit 12 and a chip size of the image pickup device 10 may be miniaturized. Further, since capacitances of the capacitors C21, C22, and C23 may be increased without changing a two-dimensional area thereof or without increasing a scale of the A/D converter 152, fixed pattern noise of the pixel 11 may be effectively reduced.

Each of the capacitors C21, C22, and C23 in the A/D converter 152 are formed by using stacked/trench capacitors 20, 30 or 50 and 54. Alternatively, only one or two of the capacitors C21, C22 and to C23 may be formed by using stacked/trench capacitors and the other capacitor(s) may be formed by using planar capacitors, so that two-dimensional capacitors and three-dimensional capacitors are mixed.

Figure 7:
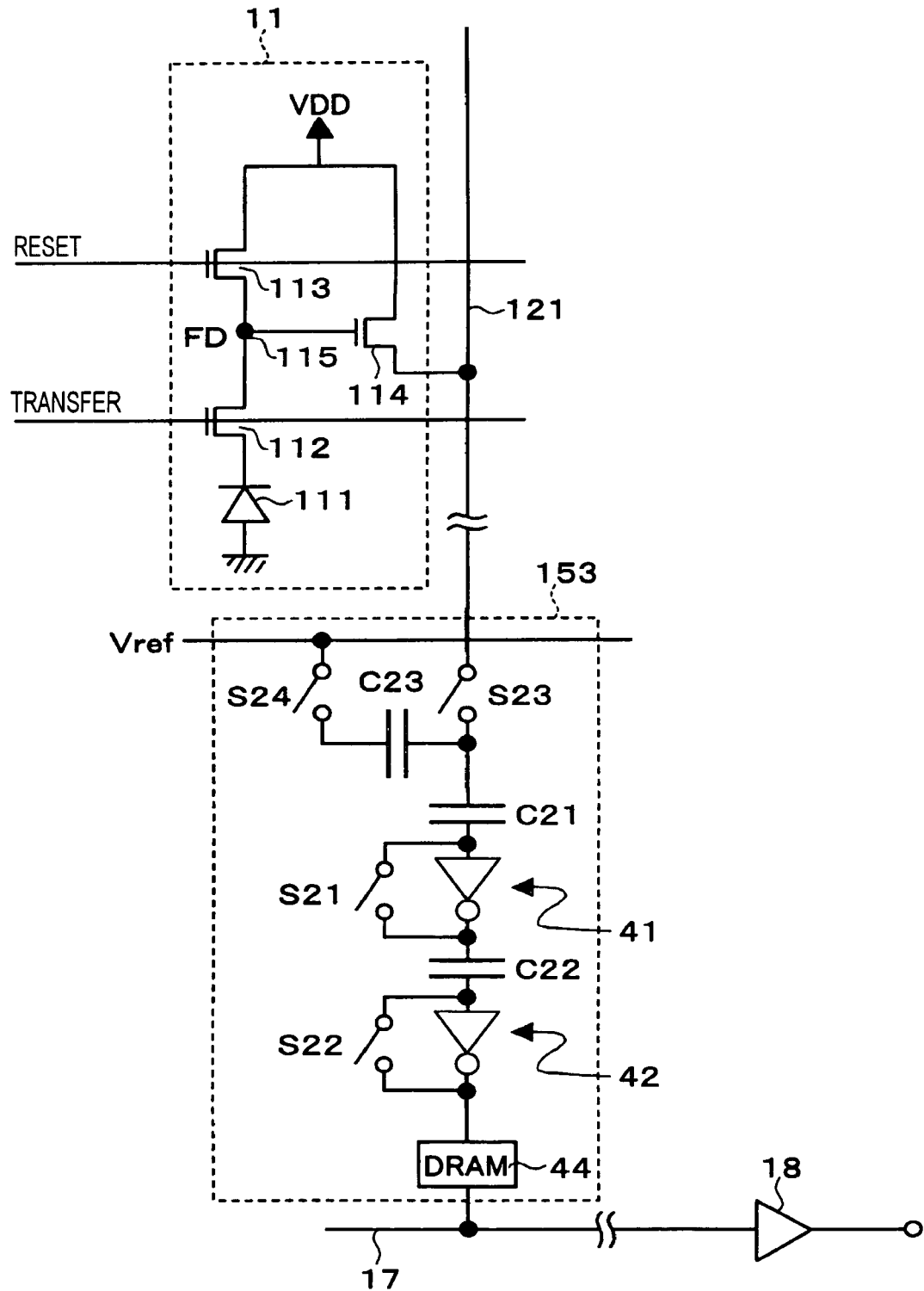
FIG. 7 is a circuit diagram showing an exemplary configuration of a second embodiment of an A/D converter suitable for use in an image pick-up device consistent with the present invention.

FIG. 7 is a circuit diagram showing an exemplary configuration of a second embodiment of A/D converter 153 suitable for use in the image pick-up device 10. In this implementation, the A/D converter 153 corresponds to the A/D converter 152, except a DRAM 44 is used instead of the latch circuit 43 as shown in FIG. 7. A capacitor of the DRAM 44 is formed by arranging stacked/trench capacitors having the same configuration as those described in the A/D converter 153. The capacitors C21, C22, and C23 are formed by two-dimensionally arranging many stacked/trench capacitors 52 and 54. In the DRAM 44, stacked/trench capacitors 52 and 54 having the same configuration are arranged such that one capacitor is assigned to 1 bit. Accordingly, capacitors of different sizes and purposes can be formed in the same step and mixed mounting in the DRAM 44 can be efficiently realized.

In the above-described embodiments, the present invention is applied to an image pickup device 10, which is depicted as a CMOS image sensor. However, the present invention is not limited to an application to a CMOS sensor. For example, the present invention can be applied to any XY-address solid state image pickup devices represented by a MOS image sensor, and to a horizontal scanning solid state image pickup device, in which a signal charge which has been photoelectrically converted by a pixel is transferred by a vertical transfer unit provided for each of vertical pixel columns, and each signal voltage obtained by voltage conversion performed by a charge detecting unit provided in a subsequent stage of the vertical transfer unit of each vertical column is sequentially read by horizontal scanning.

In the solid state image pickup device having the above-described configuration, a capacitance of the stacked capacitor or the trench capacitor does not exclusively depend on its two-dimensional area. Since the stacked capacitor or the trench capacitor has a three-dimensional configuration, the capacitance thereof also depends on an area in a depth (height) direction. Therefore, the capacitance can be increased by increasing an area in a depth direction without increasing the two-dimensional area. In other words, by increasing the area in a depth direction, the two-dimensional area can be reduced accordingly, so that the two-dimensional area of the capacitor can be reduced.

According to the present invention, by using a stacked capacitor 20 or a trench capacitor 30 as a capacitor included in a signal processing circuit which is provided for each of pixel columns in a pixel array unit, a two-dimensional area of the capacitor and a scale of the signal processing circuit can be reduced. Accordingly, the pixel array unit can be miniaturized and a chip size can also be miniaturized. Further, a capacitance of the capacitor can be increased without changing the two-dimensional area thereof, in other words, without increasing a scale of the signal processing circuit.

Figure 8:
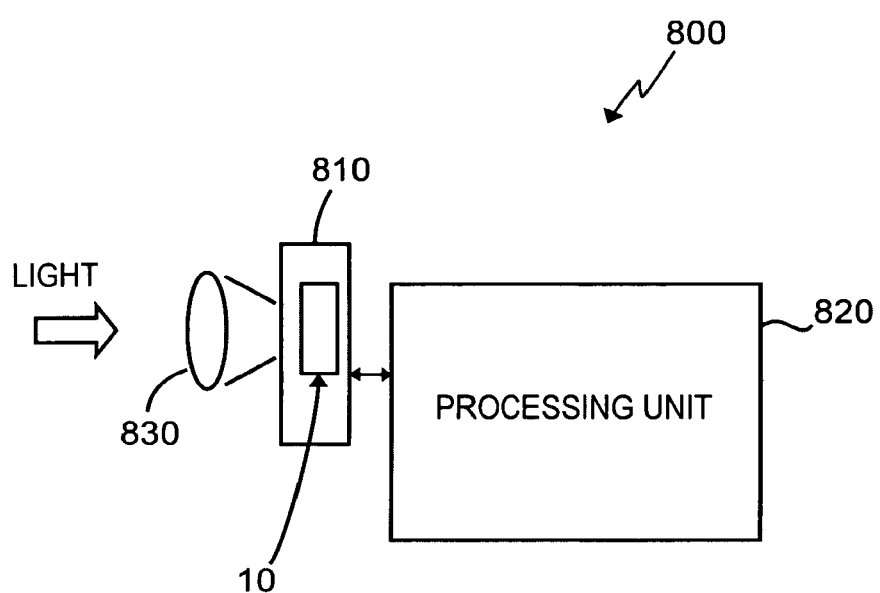
FIG. 8 is a block diagram depicting an exemplary configuration of a camera system embodying the present invention.

The present invention may be applied to imaging apparatuses including a camera system or other imaging module product. For example, in FIG. 8 a block diagram is shown depicting an exemplary configuration of a camera system 800 embodying the present invention. The camera system 800 includes a sensing portion 810 that incorporates the image pickup device 10, and an optical system 815 though which incident light is received by the pixel array unit 12 of the image pickup device 10. The camera system 800 further includes a processing unit 820 that is operatively connected to the sensing portion 810 such that the processing unit 820 is adapted to receive the processed signals of the pixels 11 via the column circuits 15 and the output circuit 18. By implementing the column circuits 15 using a stacked capacitor 20, a trench capacitor 30 or a column capacitor 50 (that using an array of stacked/trench capacitors 52 and 54) for the respective capacitors C11, C12, or C21, C22, C23, the sensing portion 810 and the processing unit 820 may be miniaturized in accordance with a new design rule (e.g., 65 nm) for a printed circuit component feature without decreasing the capacitance of the respective column circuit's capacitors C11, C12, or C21, C22, C23 as discussed above.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. An imaging device, comprising:
   a plurality of pixels, each pixel including a photoelectric converting element;
   a plurality of vertical signal lines; and
   a plurality of A/D converters, each provided for a column of the pixels, at least one of the plurality of A/D converters comprising:
   a trench/stacked capacitor having one of a trench and a stacked structure and comprising a plurality of capacitors arranged in a matrix form;
   a comparator having an input terminal that is coupled to one of the plurality of vertical signal lines via the trench/stacked capacitor; and
   a switch connected between the one of the plurality of vertical signal lines and the trench/stacked capacitor.

2. The imaging device according to claim 1, wherein the trench/stacked capacitor includes a metallic wiring having a T-shape in a cross section.

3. The imaging device according to claim 2, wherein the metallic wiring having a T-shape is disposed in a groove of a substrate.

4. The imaging device according to claim 2, wherein the metallic wiring having a T-shape is embedded in a substrate.

5. The imaging device according to claim 1, wherein each capacitor of the plurality of capacitors has substantially a same capacitance.

6. The imaging device according to claim 1, wherein the trench/stacked capacitor has a trench structure.

7. The imaging device according to claim 1, wherein the trench/stacked capacitor has a stacked structure.

8. The imaging device according to claim 7, wherein the trench/stacked capacitor has a three-dimensional height within the column circuit.

9. The imaging device according to claim 1, wherein the trench/stacked capacitor has a three-dimensional height.

10. The imaging device according to claim 1, wherein the at least one of the plurality of A/D converters is a column circuit.

11. An imaging device, comprising:
    a plurality of pixels, each pixel including a photoelectric converting element;
    a plurality of vertical signal lines; and
    a plurality of A/D converters, each provided for a column of the pixels, at least one of the plurality of A/D converters comprising:
    a plurality of capacitors including a metallic wiring having a T-shape in a cross section and arranged in a matrix form;
    a comparator having an input terminal that is coupled to one of the plurality of vertical signal lines via the plurality of capacitors; and
    a switch connected between the one of the plurality of vertical signal lines and the plurality of capacitors.

12. The imaging device according to claim 11, wherein the metallic wiring having a T-shape is disposed in a groove of a substrate.

13. The imaging device according to claim 11, wherein the metallic wiring having a T-shape is embedded in a substrate.

14. The imaging device according to claim 11, wherein each capacitor of the plurality of capacitors has substantially a same capacitance.

15. The imaging device according to claim 11, wherein each capacitor of the plurality of capacitors has a trench structure.

16. The imaging device according to claim 11, wherein each capacitor of the plurality of capacitors has a stacked structure.

17. The imaging device according to claim 11, wherein the at least one of the plurality of A/D converters is a column circuit.

* * * * *